Figure 7:
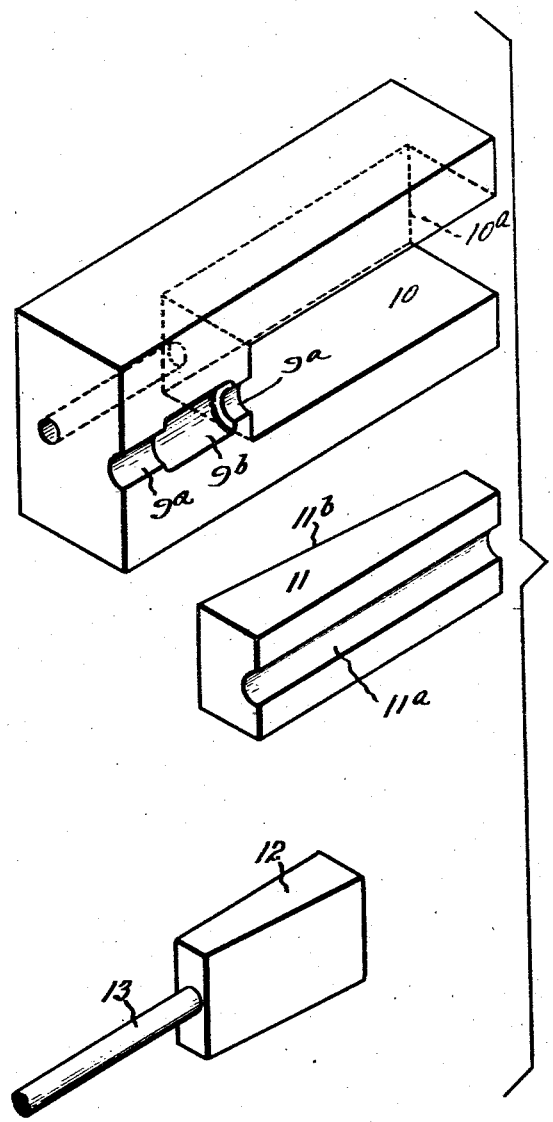

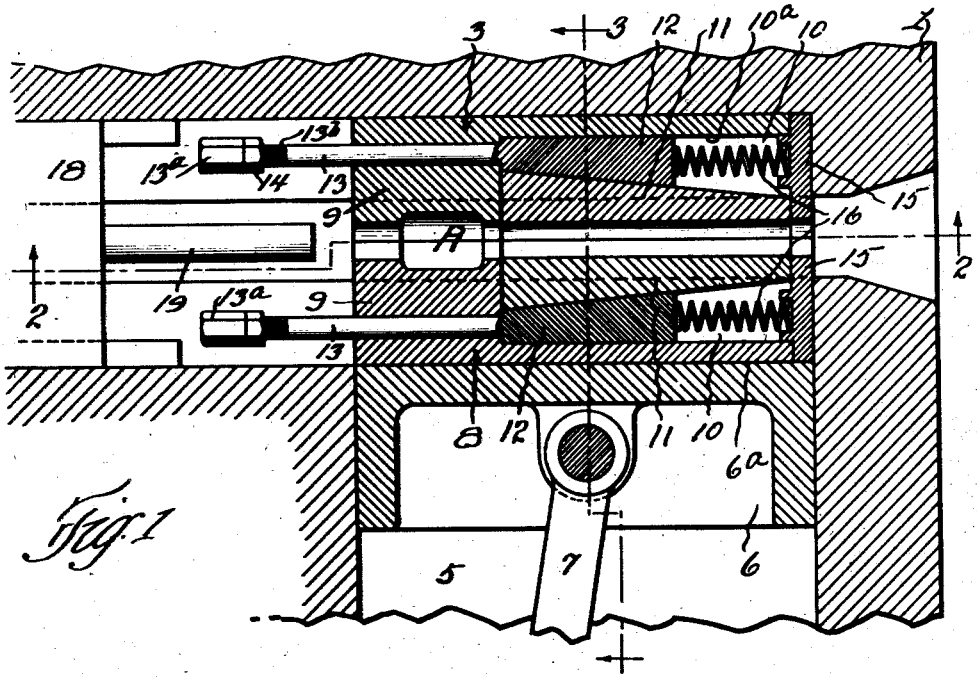

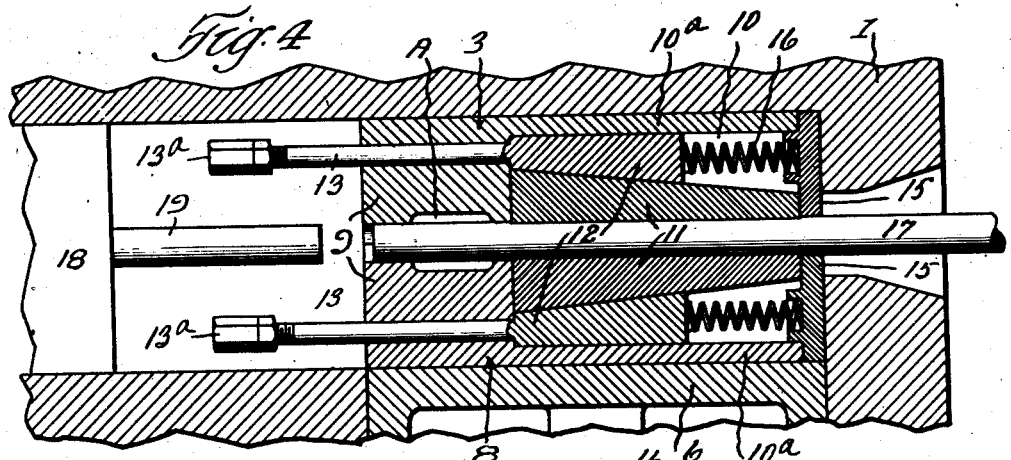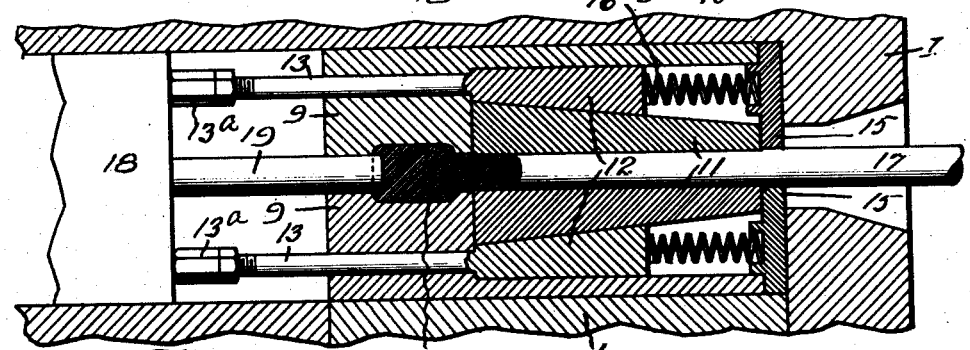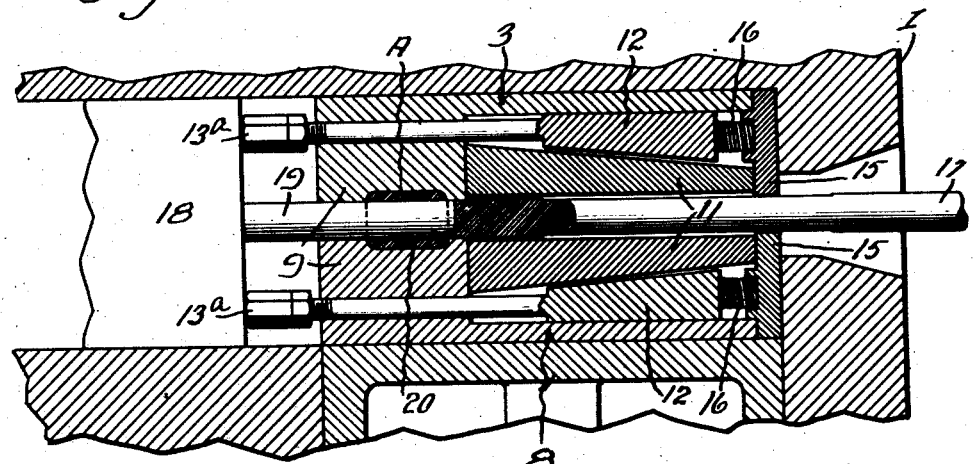

May 8, 1928. 1,668,996
H. N. ANDERSON
PROCESS OF AND APPARATUS FOR MAKING SLEEVE LIKE ARTICLES
Filed June 12, 1926 3 Sheets-Sheet 3

Inventor
Harold N. Anderson,
By Hill, Brock & West.
Attorney

Patented May 8, 1928.

1,668,996

UNITED STATES PATENT OFFICE.

HAROLD N. ANDERSON, OF LAKEWOOD, OHIO.

PROCESS OF AND APPARATUS FOR MAKING SLEEVE-LIKE ARTICLES.

Application filed June 12, 1926. Serial No. 115,490.

This invention relates to a process of and apparatus for making forged bodies from a bar of stock. In the particular embodiment of the invention shown herein the forged bodies are in the form of thin-walled sleeve-like members, such as are used in the production of pipe couplings and relatively thin-walled nuts.

It has been proposed to produce articles of the character referred to by subjecting an end of a bar of stock to an upsetting action, the portion so subjected being held during such upsetting operation in operative relation to a cavity or mold capable of giving a predetermined form to the article. After this operation, the bar or rod is then subjected to the action of a tool which serves to give a final shape to the article; where sleeve-like members are to be produced, the tool serves to push out or extrude stock from the central portion of the upset end, leaving the sleeve-like part.

It is the general object of my invention to enable the end of the bar to be preliminarily shaped in the manner described and to complete the formation of the article without transferring the stock from one set of dies to another and without the necessity for changing the form of the shaping cavity, whereby the bar may be upset and the excess metal removed by further, and preferably, continuous, movement of the punch or shaping tool in the direction of the length of the bar and without the necessity for so transferring the work or changing the form of the shaping cavity.

I accomplish the foregoing object and other and more limited objects in and through the process described hereinafter and realized by the apparatus shown in the drawings, wherein Fig. 1 represents a sectional view through a pair of dies and the parts cooperating therewith adapted to realize my process, the said section corresponding substantially to the line 1—1 of Fig. 3; Figs. 2 and 3 are sectional details corresponding respectively to the lines 2—2 and 3—3 of Fig. 1; Figs. 4, 5 and 6 are views, similar to Fig. 1, but showing the positions of the parts during successive steps in the operation of the apparatus while realizing my process; and Fig. 7 a view showing separate parts of the die in perspective.

Describing the parts by reference characters, 1 denotes a part of the bed of an upsetting or forging machine of any approved construction. This bed is shown as provided with a suitable angular notch or recess 2 for the reception of the fixed die 3, the die being shown as secured within said recess by means of a clamp 4. Reciprocably mounted in a guide 5 in another part of the bed is the movable die holder 6 having an operating arm or connecting rod 7 pivoted thereto, the said holder having a movable die 8 secured within a channeled seat $6^a$ thereof.

The dies 3 and 8 are identical in construction, comprising each a block 9 having at one end thereof a semi-cylindrical bore $9^a$ communicating with an enlarged semi-cylindrical cavity $9^b$ from which the semi-cylindrical bore $9^a$ is continued to the recess 10, which is channel-shaped in cross section and the back wall of which is indicated at $10^a$. Slidable transversely in each recess 10, is a gripping block 11, each block having a semi-cylindrical bore $11^a$ constituting an extension of the corresponding semi-cylindrical bore $9^a$. Each block 11 is adapted to fit within the appropriate recess 10, but is of less depth than the depth of said recess, for a purpose to be described. Slidably mounted between the inclined back $11^a$ of each block 11 and the back wall $10^a$ of the recess in each block 9 is a wedge block 12, each block being of such shape as to fit within the narrow or front end of the space between each block 11 and the back of the recess 10 therefor and being shorter than said recess. Each of the wedge blocks 11 is provided with a push rod 13 which extends through and beyond the front end of the block 9 adjacent thereto, each rod being provided with a head $13^a$ adjustably supported thereon, as by means of a thread $13^b$ and a lock nut 14 on such rod. Between the enlarged or rear end of each wedge block 12 and a backing plate 15 at the end of each recess 10, there is interposed a helical spring 16 which tends to push each of the wedge blocks to the opposite or front end of its seat, thereby to press the gripping blocks 12 radially inwardly into engagement with the bar or rod 17.

18 denotes a head carrying the upsetting punch 19. This head is reciprocated toward and from the dies 3 and 8 by operating means (not shown) such as is in common use on forging and upsetting machines, while the arm or connecting rod 7 is operated toward and from the fixed die 3 by mechanism (not shown) also in common use in such machines.

With the parts constructed and arranged as described and with the dies 3 and 8 separated, the stock, consisting of the bar or rod 17, will be moved to a position such as shown in Fig. 4, with the upsetting end extending across and in front of the cavity A a sufficient distance to enable the end portion, when upset, to fill such cavity. The point to which the end of said bar or rod shall be moved will in practice be determined by an ordinary stock gage. When the bar or rod has been so advanced, as shown in Fig. 4, the arm or connecting rod 7 will be operated to bring the dies 3 and 8 together and to cause the blocks 11 to grip the stock firmly, the wedge blocks 12 at this time being in the reduced ends of their respective recesses 10, behind the gripping blocks.

The stock being thus gripped, the head 18 is moved toward the dies, and the punch 19 operates in the usual manner upon the adjacent front end of the bar or rod 17 to upset such end, filling the cavity A formed by the two semi-cylindrical cavities 9$^b$, as shown in Fig. 5. The operating ends of the push rods 13 are so arranged that, when the punch shall have upset the end of the bar or rod in the manner described, the head 18 engages the heads on said rods, and, as the head 18 moves further toward the right, the wedge blocks 12 are pushed toward the enlarged rear ends of their respective chambers 10, thereby relaxing the grip of the blocks 11 upon the part of the bar or rod 17 adjacent thereto. This results in holding the bar or rod only by the engagement of the upset portion thereof with the recess A; the further movement of the head and punch to the right will enable the punch to push out the metal from the center of such upset portion by the time the end of the punch shall have crossed the cavity, as indicated in Fig. 6. The head 18 may then be moved to the left and the dies 3 and 8 separated, permitting the removal of the sleeve-like member 20 produced by the operations just described. As the head 18 is retracted, the springs 16 move the wedge blocks 12 to the reduced ends of their respective chambers or recesses 10, thereby moving the gripping blocks 11 to stock-engaging position within their respective dies. The bar or rod 17 may then be advanced again to the positions shown in Figs. 4-6 and the operations repeated.

By virtue of the apparatus shown herein and the mode of operation thereof, I am enabled to produce forged bodies by a continuous operation, wherein an end of the bar of stock is upset into a cavity or mold, the bar being firmly gripped during such operation and wherein, after such operation, the grip upon the bar is relaxed and a final form is given to such upset portion by further movement of the tool in a direction longitudinally of the bar. Specifically, I am enabled to produce ring-like or sleeve-like bodies by a continuous operation wherein an end of the bar of stock is upset by a punch into a suitable shaping cavity formed in dies, the bar being firmly gripped during such upsetting and shaping operation, and wherein the grip upon the bar is relaxed at the completion of the upsetting operation, the bar being held by the engagement of its upset portion with the forming cavity during the further continued movement of the punch in the upsetting direction, thereby to extrude from such forged or upset portion the stock forming the central portion thereof. By so doing, I have reduced the number of separate operations required for the production of such articles and have effected a similar reduction in the number of the mechanisms employed.

Having thus described my invention, what I claim is:

1. The process of producing a forged body from a bar of stock which consists in holding the body of said bar with one end exposed, moving a tool against such end thereby to upset such end and impart a predetermined form thereto, releasing the action of the holding means upon the body of the said bar by further movement of the said tool in the upsetting direction, and moving the bar in a direction longitudinal thereof by such further movement of the tool, thereby to impart additional shape to the said body.

2. The process of producing a forged body from a bar of stock which consists in holding said bar with one end in operative relation to a shaping cavity, moving a tool of smaller diameter than said cavity against such end thereby to expand such end into said cavity and impart a predetermined form thereto, releasing the action of the holding means upon the bar without changing the form of said cavity by further movement of the said tool in the upsetting direction, and moving the bar in a direction longitudinal thereof by such further movement of the tool, thereby to extrude from such expanded or upset end the stock forming the central portion thereof.

3. The process of producing a ring-like body which consists in gripping the body of a bar or rod of stock with one end in operative relation to an upsetting cavity; moving an upsetting tool against such end thereby to upset such end portion of the bar or rod into said cavity while the bar or rod is so held; holding said bar or rod against movement by the engagement of the upset portion thereof with the wall of the said cavity, meanwhile releasing the grip upon the body of the bar or rod of stock, and extruding the stock from the center of such upset portion and moving such extruded stock together with the bar or rod of which it forms a continuation, by further movement of the tool in the upsetting direction, the movement of said tool for so upsetting and extruding being substantially continuous and in the same direction.

4. The process of producing a ring-like body which consists in holding the body of a bar or rod of stock with one end in operative relation to an upsetting cavity; moving an upsetting tool against such end thereby to upset such end portion of the bar or rod into said cavity while the bar or rod is so held; releasing the action of the holding means upon the body of the bar or rod and holding the bar or rod against movement by the engagement of the upset portion thereof with the wall of the cavity, and extruding the stock from the center of such upset portion and moving such extruded stock and the bar or rod of which it forms a continuation by further movement of the tool in the upsetting direction.

5. The process of producing a ring-like body which consists in holding the body of a bar or rod of stock with one end thereof in operative relation to an upsetting cavity; moving an upsetting tool into engagement with such end of such bar or rod while the latter is so held, thereby upsetting such end into such cavity; releasing the action of the holding means upon the body of the bar or rod by a further movement of the tool in the upsetting direction, meanwhile holding the said bar or rod by the engagement of the upset portion thereof with the wall of said cavity; and extruding the stock from the center of such upset portion and moving such extruded stock and the bar or rod of which it forms a continuation by further movement of the tool in such upsetting direction.

6. The process of producing a ring-like body which consists in gripping the body of a bar or rod of stock adjacent to one end thereof, with such end in operative relation to an upsetting cavity; moving an upsetting tool into engagement with the appropriate end of such bar or rod while the latter is so gripped, thereby upsetting such end into such recess; relaxing the grip upon the body of the rod or bar as the tool is moved further in the upsetting direction, meanwhile holding the said bar or rod by the engagement of the upset portion thereof with the wall of said recess; and extruding the stock from the center of such upset portion and moving such extruded stock and the bar or rod of which it forms a continuation by such further movement of the tool.

7. The process of producing a forged body from a bar of stock which consists in first holding the body of said bar with an end exposed, moving a tool against such end thereby to expand or upset such end and impart a predetermined form thereto, releasing the action of the holding means upon the body of the bar, as the tool is advanced, and moving the said tool further in the forming or upsetting direction, meanwhile engaging the expanded or upset portion of the bar whereby the inner portion of said expanded or upset end and the bar are moved bodily by such tool away from the outer or peripheral portion of such end.

8. The process of producing a forged body from a bar of stock which consists in holding the body of said bar with an end in operative relation to a shaping cavity, moving a tool of smaller diameter than said cavity against such end thereby to expand or upset such end into said cavity and impart a predetermined form thereto, releasing the action of the holding means upon the body of the bar as the tool is advanced but without changing the form of said cavity, and moving the said tool further in the forming or upsetting direction while the outer or peripheral portion of the expanded or upset end of the bar is engaged by a wall of said cavity, whereby the inner portion of such upset or expanded end and the bar are moved bodily by such tool away from the outer or peripheral portion of such end.

In testimony whereof, I hereunto affix my signature.

HAROLD N. ANDERSON.